(12) United States Patent
Kaiserman et al.

(10) Patent No.: US 12,091,235 B2
(45) Date of Patent: Sep. 17, 2024

(54) PRINTABLE PATTERN FILTERS

(71) Applicant: Ideators, LLC, New York, NY (US)

(72) Inventors: Terrance Kaiserman, Loxahatchee, FL (US); Andrew Ferber, New York, NY (US); Joseph Diresta, Demarest, NJ (US)

(73) Assignee: Ideators, LLC, New York, NY (US)

( * ) Notice: Subject to any disclaimer, the term of this patent is extended or adjusted under 35 U.S.C. 154(b) by 557 days.

(21) Appl. No.: 15/852,078

(22) Filed: Dec. 22, 2017

(65) Prior Publication Data

US 2018/0178973 A1 Jun. 28, 2018

Related U.S. Application Data (60) Provisional application No. 62/438,653, filed on Dec. 23, 2016.

(51) Int. Cl.
| | |
|---|---|
| *B65D 85/804* | (2006.01) |
| *A47J 31/06* | (2006.01) |
| *A47J 31/36* | (2006.01) |
| *A47J 31/44* | (2006.01) |

(52) U.S. Cl.
CPC ....... *B65D 85/8061* (2020.05); *A47J 31/0673* (2013.01); *A47J 31/3695* (2013.01); *A47J 31/446* (2013.01)

(58) Field of Classification Search
CPC . B65D 85/8043; A47J 31/446; A47J 31/0673; A47J 31/3695
See application file for complete search history.

(56) References Cited

U.S. PATENT DOCUMENTS

| | | | |
|---|---|---|---|
| 2,926,088 A | * | 2/1960 | Spiselman ............ A23F 5/267 426/132 |
| 5,124,177 A | | 6/1992 | Kasmark, Jr. et al. |
| 5,298,267 A | | 3/1994 | Gruenbacher |
| 5,840,189 A | | 11/1998 | Sylvan et al. |
| 5,885,633 A | | 3/1999 | Lehrer |
| 5,932,260 A | | 8/1999 | Soughan |
| RE36,516 E | | 1/2000 | Lehrer |
| 6,607,762 B2 | | 8/2003 | Lazaris et al. |
| 7,069,837 B2 | | 7/2006 | Sachtleben |
| 7,398,726 B2 | | 7/2008 | Streeter et al. |

(Continued)

FOREIGN PATENT DOCUMENTS

EP 0 615 921 A1 9/1994

OTHER PUBLICATIONS

International Search Report from PCT/US17/68171, dated Feb. 22, 2018, 24 pages.

*Primary Examiner* — Viren A Thakur
*Assistant Examiner* — Chaim A Smith
(74) *Attorney, Agent, or Firm* — Lerner David LLP (57) ABSTRACT

The technology relates to a beverage cartridge. The beverage cartridge may comprise a filter, an enclosure, a coating, and a supplement. The filter may have a predetermined permeability to permit a fluid to flow therethrough. The enclosure may at least substantially surrounding said filter. The coating may be arranged on at least one predetermined portion of the filter, wherein the coating decreases the permeability of the filter to control the flow of the fluid therethrough. The supplement may be arranged on the filter, the supplement adapted to be dissolved or dispersed in the fluid.

12 Claims, 9 Drawing Sheets

(56) References Cited

U.S. PATENT DOCUMENTS

| | | |
|---|---|---|
| 7,543,527 B2 | 6/2009 | Schmed |
| 8,245,854 B2 | 8/2012 | Hassebrauck |
| 2001/0010297 A1 | 8/2001 | Pulek et al. |
| 2002/0066700 A1 | 6/2002 | Dolfel et al. |
| 2004/0265436 A1* | 12/2004 | Cai .................... A47J 31/0689 426/112 |
| 2005/0051478 A1 | 3/2005 | Karanikos et al. |
| 2006/0065127 A1 | 3/2006 | Dalton et al. |
| 2009/0095164 A1 | 4/2009 | Celeste |
| 2010/0239733 A1 | 9/2010 | Yoakim et al. |
| 2012/0058226 A1 | 3/2012 | Winkler et al. |
| 2014/0161940 A1 | 6/2014 | Aviles et al. |
| 2015/0216348 A1 | 8/2015 | Aus Der Fuenten et al. |
| 2016/0244250 A1 | 8/2016 | Dolan, Jr. |
| 2018/0160845 A1 | 6/2018 | Beaulieu et al. |

* cited by examiner

PRINTABLE PATTERN FILTERS

CROSS-REFERENCE TO RELATED APPLICATIONS

The present application claims the benefit of the filing date of U.S. Provisional Patent Application No. 62/438,653 filed Dec. 23, 2016, the disclosure of which is hereby incorporated herein by reference.

BACKGROUND

Cartridges for use with beverage making machines are well known, and can include one or more filters as well as a beverage medium, such as ground coffee beans, tea leaves, etc. In some cartridges, the filter is located between two or more portions of an interior space (e.g., one portion in which a beverage medium is located and a second portion into which liquid that has passed through the permeable filter can flow). Examples of such cartridges are disclosed in U.S. Pat. Nos. 5,840,189 and 6,607,762. Those cartridges can be used with a beverage making machine like that described in U.S. Pat. No. 7,398,726. The disclosures of U.S. Pat. Nos. 5,840,189; 6,607,762; and 7,398,726 are hereby incorporated by reference in their respective entireties.

In use, the beverage making machine introduces a pressurized fluid into a cartridge. The pressurized liquid may make contact with the beverage medium as it percolates through a filter. Depending upon the permeability of the filter and the pressure of the liquid, the pressurized liquid may percolate through the filter at a particular rate. Moreover, the pressurized fluids contact with the beverage medium may be limited to only certain portions of the medium depending upon the flow rate and flow pattern of the pressurized liquid through the filter. As such, the pressurized liquid may not extract the entirety of the beverage medium leading to a weak beverage and wasted beverage medium.

Accordingly it is desirable to provide a cartridge that controls the flow rate and pattern of the pressurized fluid in order to assure adequate extraction of the beverage medium.

BRIEF SUMMARY

Embodiments within the disclosure relate generally to cartridges and beverage cartridges. One aspect includes a cartridge comprising a filter material arranged to separate the cartridge into first and second compartments, wherein the first compartment stores a first substance and is positioned adjacent the second compartment; a coating arranged on at least one portion of the filter material, wherein the coating decreases the permeability of the filter material at the at least one portion of the filter material; and a first supplement arranged on the filter material.

In some instances the may include a sidewall; a bottom; and an opening, wherein the sidewall, bottom, and opening form a frustoconical shape. The cartridge may include a lid, the lid sealing the opening. In some embodiments a first side of the filter is within the first compartment, and a second, opposite side of the filter is within the second compartment. In some instances the at least one portion of the filter is on the first side of the filter.

In some instances the coating makes the at least one portion of the filter material impermeable. In some instances the coating is printed directly onto the at least one portion of the filter material. In some embodiments the coating is an ink comprised of one or more solvent, water, or free radical based resins.

In some instances the first supplement is printed directly on the coating, such that a first side of the coating contacts the filter and the first supplement contacts, a second, opposite side of the coating. In some embodiments a second supplement is arranged directly on the filter. In some embodiments a second supplement is printed on the first supplement, such that a first side of the first supplement contacts the coating, and a second opposite side of the first supplement contacts the second supplement. In some instances the first supplement is arranged on the second side of the filter. In some embodiments the first supplement is one or more of sweeteners, flavorings, fragrances, pharmaceuticals, and nutrative compounds.

Another aspect of the invention includes a beverage cartridge comprising a filter having a predetermined permeability to permit a fluid to flow therethrough; an enclosure at least substantially surrounding said filter; a coating arranged on at least one predetermined portion of the filter, wherein the coating decreases the permeability of the filter to control the flow of the fluid therethrough; and a supplement arranged on the filter, the supplement adapted to be dissolved or dispersed in the fluid. In some instances the filter stores a first substance therein.

In some instances the coating is an ink comprised of one or more solvent, water, or free radical based resins. In some embodiments the coating is printed directly on the at least one predetermined portion of the filter. In some instances the coating is arranged to direct the flow of the fluid through the filter.

In some instances the supplement is printed directly on the coating. In some embodiments the supplement is one or more of sweeteners, flavorings, fragrances, pharmaceuticals, and nutrative compounds.

DETAILED DESCRIPTION

Figure 1:
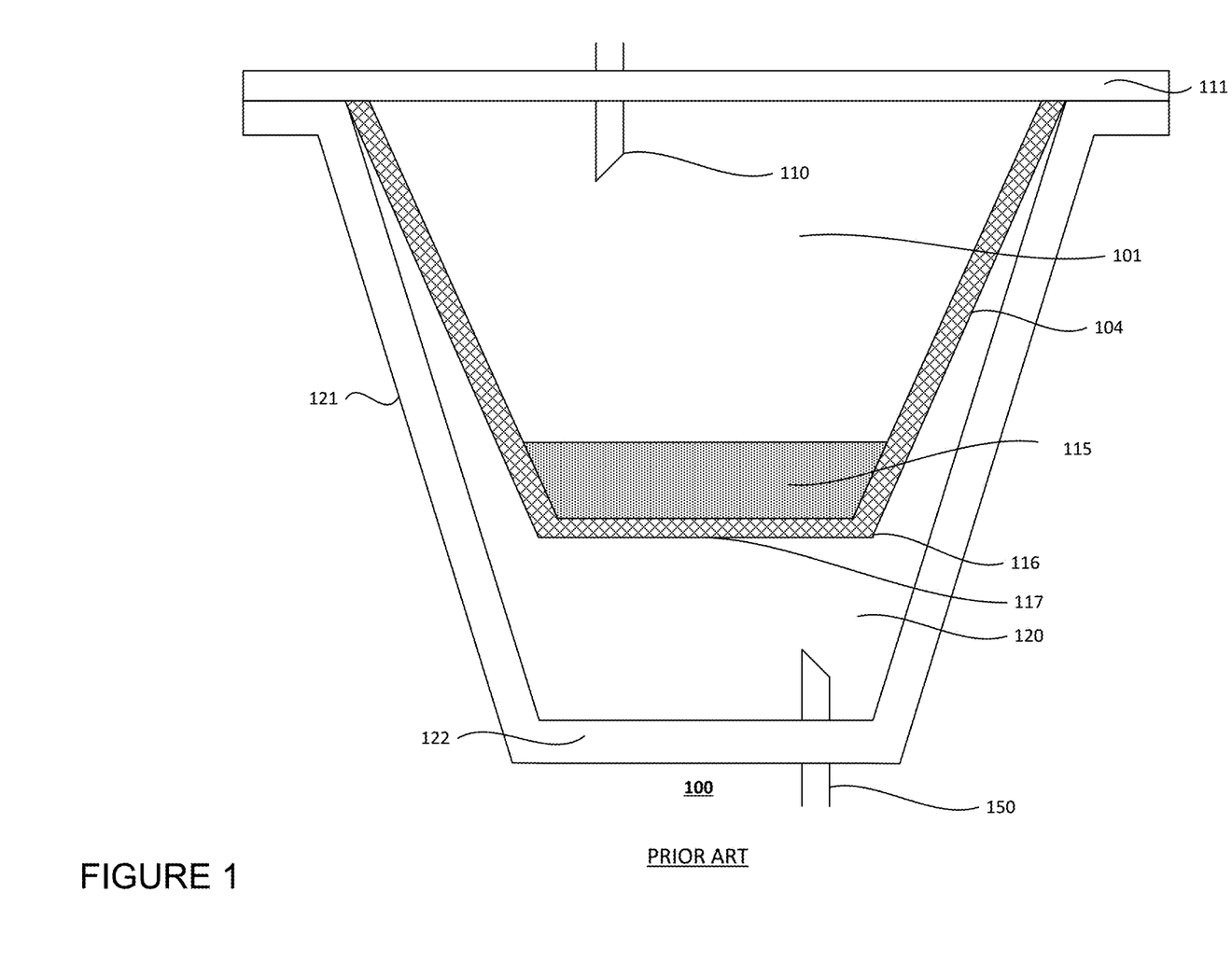
FIG. 1 is an illustration of a prior art cartridge and filter.

As previously discussed, known cartridges are limited in that they are configured to contain a filter which allows a pressurized fluid which has extracted a beverage medium to percolate through the filter at a particular flow rate with no control over the flow pattern of the pressurized fluid. FIG. 1 illustrates one such cartridge 100. The cartridge 100 may be used in a beverage forming machine which introduces a pressurized fluid into the cartridge via an externally located injection needle 110 which penetrates a lid 111.

A filter 104 may be positioned to divide the cartridge into two compartments 101 and 120. The first compartment 101 may include the area located between the filter 104 and the lid 111. The second compartment 120 may include the area between the filter 104 and the walls 121 and the base 122 of the cartridge.

A beverage medium 115, such as coffee, may be positioned within the first compartment 101. The filter 104 is intended to prevent the beverage medium 115 from passing into the second compartment 120. In this regard, the filter may be made of a filter material comprised of bleached and/or unbleached pulp filaments approximately 20 micrometers wide, or more or less. In some embodiments the filter 104 may be made of a filter material including synthetic materials such as polyethylene, polypropylene or other materials. Moreover, the filter material of the filter 104 may be a combination of one or more layers of cellulosic materials and other layers of natural or synthetic materials. Further, the filter 104 may be crimped and/or configured into a specific shape such as a basket-shape as shown in FIG. 1, a frustoconical shape, a flat disc, etc.

Upon the injection needle 110 introducing a pressurized fluid, such as water into the cartridge, the pressurized fluid may pass through the beverage medium 115 and percolate through the filter 104 with the extract from the beverage medium 115 into the second compartment 120. The wall 121 or base 122 of the cartridge may be pierced by a second externally located needle 150 to release the pressurized fluid containing the extract from the beverage medium 115.

As the permeability of the filter 104 is the same at all locations, the flow of the pressurized fluid through the filter may occur too quickly for acceptable extraction levels of the beverage medium 115 to occur. In this regard, in order to achieve acceptable extraction of the beverage medium 115, the pressurized fluid may need to remain in contact with the beverage medium for a certain length of time. Further, since the flow of the pressurized fluid through the filter is uncontrolled, the pressurized fluid will tend to migrate to the lowest points of the filter, such as corner 116 and/or center 117 of the filter 104 or other locations which offer the least flow resistance to the pressurized fluid. As such, the pressurized fluid may pool in certain locations within the first compartment 101, and thereby contact only particular portions of the beverage medium. Therefore, the resulting fluid which passes through the filter 104 may be weak and portions of the beverage medium 115 may be wasted. The present invention includes improvements and cures the deficiencies of known cartridges and filters, such as cartridge 100 and filter 104.

Figure 2:
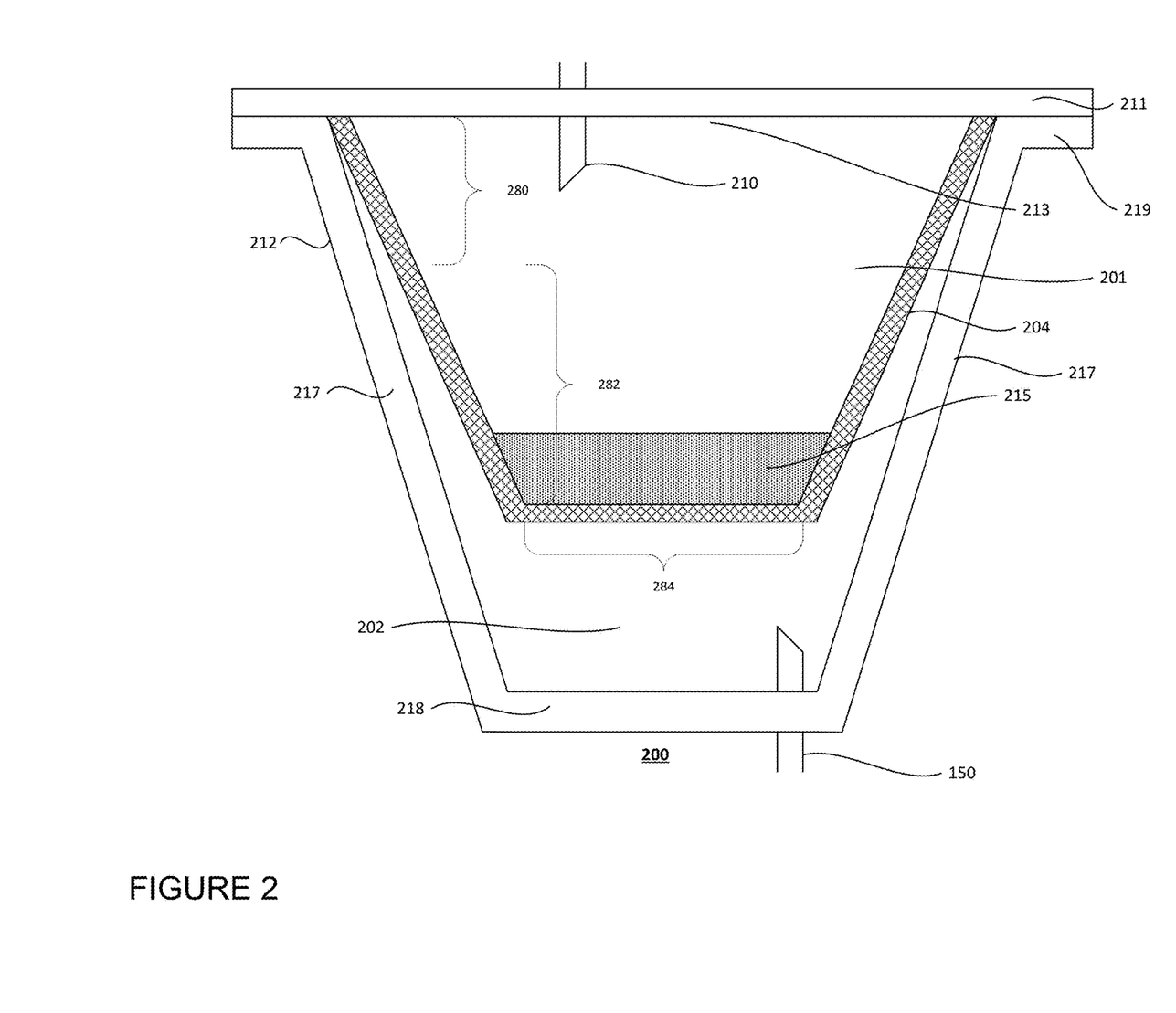
FIG. 2 is an illustration of a cartridge and filter in accordance with one aspect of the present invention.

FIG. 2 is a side cross-sectional view of a cartridge 200 that incorporates one or more aspects of the invention. The cartridge 200 include a container 212 with one or more interior spaces including a first compartment 201 and a second compartment 202 that are separated by a filter 204. The first compartment 201 is arranged adjacent to the second compartment 202. As used herein, one compartment being "adjacent" to another compartment means that such compartment is next to or within the other compartment. The cartridge may be a single serve cartridge, multi-use cartridge, or other such cartridge.

In the embodiment shown in FIG. 2, the container 212 may have a frustoconical cup shape formed by sidewalls 217, bottom 218, and an opening 213. Alternatively, the shape of the container 212 may be rectangular, spherical, semi-spherical, square, fluted, conical, cylindrical, etc. Additionally, the container 212 may have a fluted, corrugated, smooth and/or otherwise shaped sidewalls 217 and bottom. In some instances, the container 212 may not have a defined shape. In this regard, although the container 212 illustrated in FIG. 2 is of a relatively rigid and/or resilient construction so that the container 212 tends to maintain its shape, the container 212 may be made to have a more compliant and/or deformable arrangement, such as a sachet container made from a sheet of deformable material.

The opening 213 can be closed by a lid. In this regard, the lid may cover a portion or all of the opening 213. The lid may be made of any material typically used to cover a container, such as plastic, foil, paper, and/or polymer laminate material. For example, lid 211 of FIG. 2 may be a foil polymer laminate material that is attached to the rim 219 of container 212.

Although the rim 219 is arranged as an annular flange-like element in FIG. 2, in alternate embodiments the rim 219 can be arranged in other ways. For example, the rim 219 can be the top edge of the sidewall 217 without any flange element. In some instances the container 212 may not include a rim. In this scenario, the lid 211 may be attached directly to the container's walls 217, and/or other components of the cartridge. In some embodiments the container 212 may be self-sealing, thereby not having an opening 213, negating the need for the lid 211.

The size of the cartridge 200 may be based on the size of the container 212. In this regard, the cartridge 200 may be configured such that its interior space, as defined by the space within the container 212, may be any size. The interior space within container 212 may be limited by the shape of the lid 211. For instance, a lid which extends upwards above the rim 219 of container 212 may result in a larger interior space while a lid which penetrates into the container (i.e., extends below the rim towards the base 218,) may result in a smaller interior space.

The container 212, and/or the lid 211 may provide a barrier to moisture and/or gases, such as oxygen. For example, the container 212, including the sidewalls 217 and bottom 218, as well as the lid 211 may be made of one or more of a polymer laminate such as a sheet including a layer of polystyrene or polypropylene and a layer of ethylene vinyl alcohol (EVOH) and/or other barrier material, such as a metallic foil. The barrier created by the materials comprising the container 212 and lid 211 may provide protection for substances within the container 212, such as substances within the first and second compartments, 201 and 202, from unwanted exposure to moisture, oxygen and/or other materials. As such, the substances within the container may have a longer shelf-life.

In some embodiments the container may be comprised of one or more of polymers, biopolymers, compostable polymers, metals, ceramic, 3d-printable materials, nylon, polypropylene, paper, foils, etc. It should be understood, however, that the container 212 and/or the lid 211 may be made of other materials or combinations of materials, such as biopolymers, compostable polymers, paper, foils, etc.

In accordance with an aspect of the invention, a filter may be disposed within the cartridge. For example, as shown in FIG. 2, the filter 204 may have a substantially frustoconical shape. However, the filter 204 may have any suitable shape, such as a cylindrical shape, spherical shape, semi-spherical shape, a square cup shape, a domed shape, a flat shape, or other. Further, the filter 204 may have the same or different shape than the container 212.

The filter 204 may be attached to the rim 219 of the container side walls 219. For instance, as further shown in FIG. 2, an upper portion of the filter 204 may extend radially outwardly toward the container side walls 217 and attach to the rim 219 of the container 212 such that the upper portion of the filter 204 is sandwiched between the lid 211 and the rim 219 and/or attached directly to the rim. The filter 204 can be attached to the lid 211 and/or container 212 in any suitable way, such as by an adhesive, thermal welding, ultrasonic welding, over-molding, chemical bonding, crimping or other mechanical bonding, etc. As can be seen in FIG. 2, the upper portion of the filter 204 that may be attached to the rim 219 can have an annular, or washer-like shape that extends radially outwardly toward the container side walls 217, but such radial extension is not required. In some embodiments the lid 211 may extend radially inward. In some embodiments the filter 204 may be attached directly to the lid 211 or another portion of the cartridge 200. As such, the filter 204 may be suspended from the lid 211 and the first compartment may be positioned between the filter 204 and the lid 211.

The filter 204 is arranged to separate the first compartment 201 from the second compartment 202. Additional compartments in the interior space and/or sub-portions or areas of the first and second compartments, may be included in the cartridge 200 and may be created by the inclusion of additional walls and/or filters. The filter 204 may include any suitable material capable of maintaining a substance in one compartment. For instance, the filter may be comprised of one or more of filter paper, such as 37 gram Glatfelter filter paper, permeable or impermeable plastic material, a sponge like material, foam, ceramic, zeolites, cellulose, natural and/or synthetic fabrics, etc.

In some embodiments the filter may include a piece of filter paper that is arranged to allow a fluid and dissolved and/or suspended materials of a certain size to pass through, yet prevent relatively large particles from passing through. In this regard, the filter 204 may maintain a first substance 215, such as coffee grounds having a first size incapable of passing through the filter, within the first compartment 201.

A pressurized fluid may be introduced into the first compartment 201 of the cartridge 200 via an externally located injection needle 210, which may be compared to injection needle 110. The pressurized fluid, such as water, may contact the first substance 215 thereby extracting dissolved and/or suspended materials from the first substance 215. The pressurized fluid including the suspended material of a size smaller than the pores of the filter paper may start to permeate the filter 204 and move into the second compartment 202. The filter may prevent the first substance 215 from moving into the second compartment 202.

The filter 204 may have multiple stages (e.g., a coarse filter portion that filters out relatively large particles, followed by a fine filter portion that filters relatively smaller particles, etc.). In this regard, the filter 204 may include one or more portions that function to filter substances passing through the filter 204, as well as portions that are impermeable or otherwise severely restrict flow. Thus, the filter 204 can include two or more separate components, if desired. For example, the filter 204 can include a rigid, fluid-impermeable plastic sleeve that is attached to the lid 211. At a location away from the lid 211, a porous filter paper can be attached to the sleeve. Thus, not all portions of the filter need be permeable to fluids.

The filter may also have areas with different permeability to assist in the direction of flow and flow rate of the substances within the cartridge. For example, filter 204 may include three regions 280, 282, and 284. For instance, region 284 at the base of filter 2204 may have a low permeability, thereby restricting fluid flow through that region of the filter. Region 282 may have a relatively higher permeability than region 284 and region 280 may have a higher permeability as compared to regions 282 and 284. As such, when pressurized fluid flows into the cartridge 200, as described herein, the pressurized fluid may be restricted from passing through the filter at region 284, thereby being forced to flow to region 282 and then 284. Although only three regions are shown in FIG. 2, any number of regions may be present and each region may have the same or different permeability.

The permeability of the regions may be adjusted by manufacturing the filter such that the material forming a respective region has the desired permeability. For instance, region 280 of filter 204 may be comprised of filter paper having a first porosity, region 282 having filter paper of a second porosity less than that of the first porosity, and region 284 having a filter paper of a third porosity less than that of the first and second porosity. In some instances, additional layers of materials may be applied over a portion of the filter to adjust the porosity of the respective region, such as by gluing two layers of filter paper together. However, manufacturing a filter with filter paper having multiple porosities or by layering multiple materials may be limited by manufacturing capabilities and may be costly. Furthermore, the ability to manufacture filters having many different permeability regions (e.g., a filter with permeability regions having complex shapes,) may be difficult and require considerable time to manufacture.

To address the issues of manufacturing a filter comprised of multiple regions, a coating may be applied onto the filter in random and/or predefined patterns via printing. In this regard, a coating, which may be impermeable or capable of decreasing the permeability of the filter at the locations where the coating 350 is present, may be applied onto the filter. For instance, cartridge 300 of FIG. 3, which may be compared with cartridge 200 of FIG. 2, includes a coating 350 at a plurality of locations along the base 328 of the filter 304. As such, the plurality of locations on the filter 304 where the coating 350 was applied may have reduced permeability relative to locations of the filter where no coating was applied. In instances where the coating is impermeable, the filter may also be impermeable at locations where the impermeable coating was applied.

Figure 3:
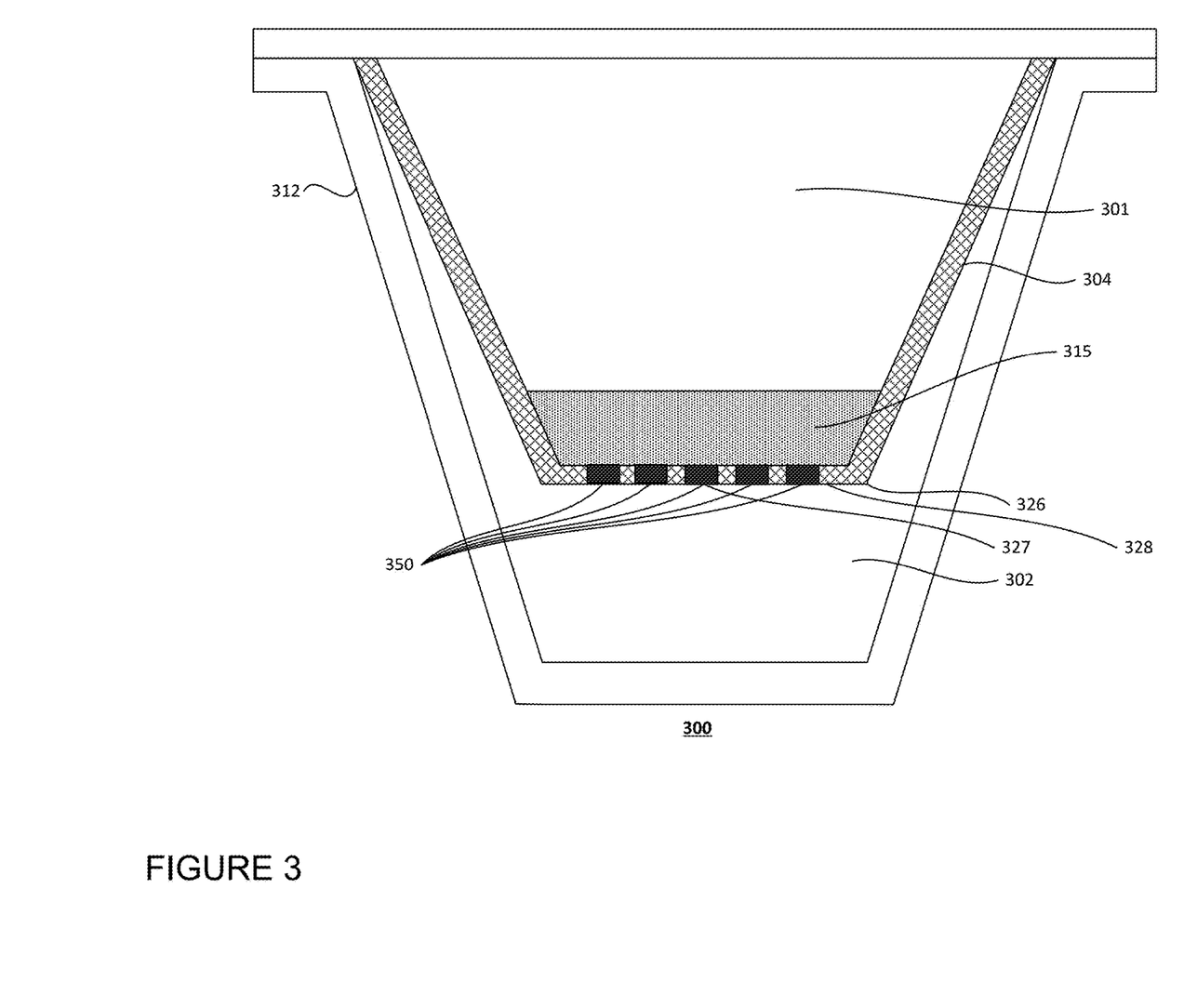
FIG. 3 is an illustration of a cartridge and filter with a coating in accordance with one aspect of the present invention.

As previously discussed, in order to achieve acceptable extraction of a substance, such as substance 315 in container 312 of FIG. 3, the pressurized fluid injected into the cartridge 300 may need to remain in contact with the substance for a certain length of time. In this regard, since the flow of the pressurized fluid will tend to migrate to the lowest points of the filter, such as corner 326 and/or center 327 of the filter 304 (or other locations which offer the least flow resistance to the pressurized fluid,) the flow of the pressurized fluid may need to be adjusted such that the pressurized fluid is in contact with all of the substance within the first compartment 301 for a certain period of time, prior to percolating to the second compartment 302. By doing such, the extraction of the substance 315 is increased, thereby increasing the strength of the final product (i.e., the pressurized fluid after extraction of the substance,) reducing waste of the substance, and reducing the amount of substance required.

Figure 4:
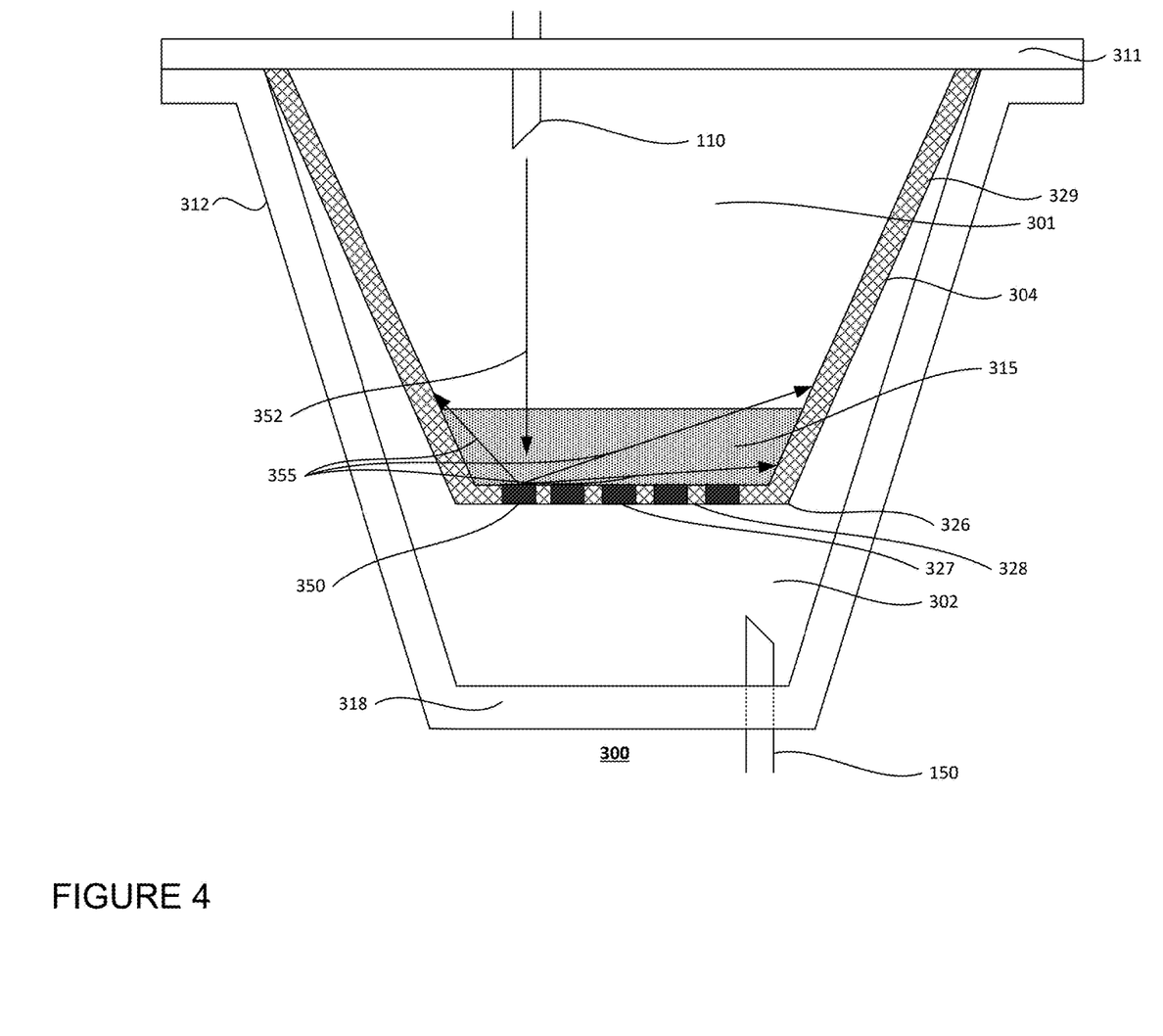
FIG. 4 is an illustration of a fluid flowing away from a coating within a filter in accordance with one aspect of the present invention.

To allow for the pressurized fluid to remain in contact with the substance within the first compartment 301 for the period of time required for an acceptable extraction, the placement and/or pattern of the coating 350 on the filter 304, may be configured such that the flow pattern and rate of the pressurized fluid through the filter 304 is controlled. For instance, as shown in FIG. 4, compartment 301 in cartridge 300 is shown being filled from an injection needle 110 with pressurized fluid in a first direction 352. As the pressurized fluid contacts the coating 350, where permeability of the filter 304 has been decreased, the pressurized fluid may be forced to flow in other directions, as illustrated by arrows 355, towards areas of the filter 304 with greater permeability. In this regard, since the base of the filter 304 has been coated, the flow pattern of pressurized fluid is altered such that the pressurized fluid flows away from the coating 350, towards uncoated portions of the filter, such as the filter walls 329, and subsequently, back up the filter walls towards the cartridge lid 311. As such, the fluid may build up in the first compartment 301, thereby saturating the first substance 315. For clarity, the flow of the pressurized fluid is shown only for a single portion of the coating 350. As the fluid permeates through the base 328 and walls 329 of the filter 304, the fluid may flow into the second compartment 302 formed by the container including base 318 through which an extraction needle, such as extraction needle 150 may puncture to extract the fluid with the dissolved or dispersed substance contained therein.

The filter 304 may be designed to achieve performance attributes which determine with the characteristics of the final product (i.e., the pressurized fluid after extraction of the substance.) The performance attributes may include one or more of beverage weight over time (e.g., the flow through the cartridge over time), final beverage weight, total dissolved solids in the pressurized fluid from the substance being extracted, and pressure within the cartridge and/or compartment, such as compartment 301.

Figure 5:
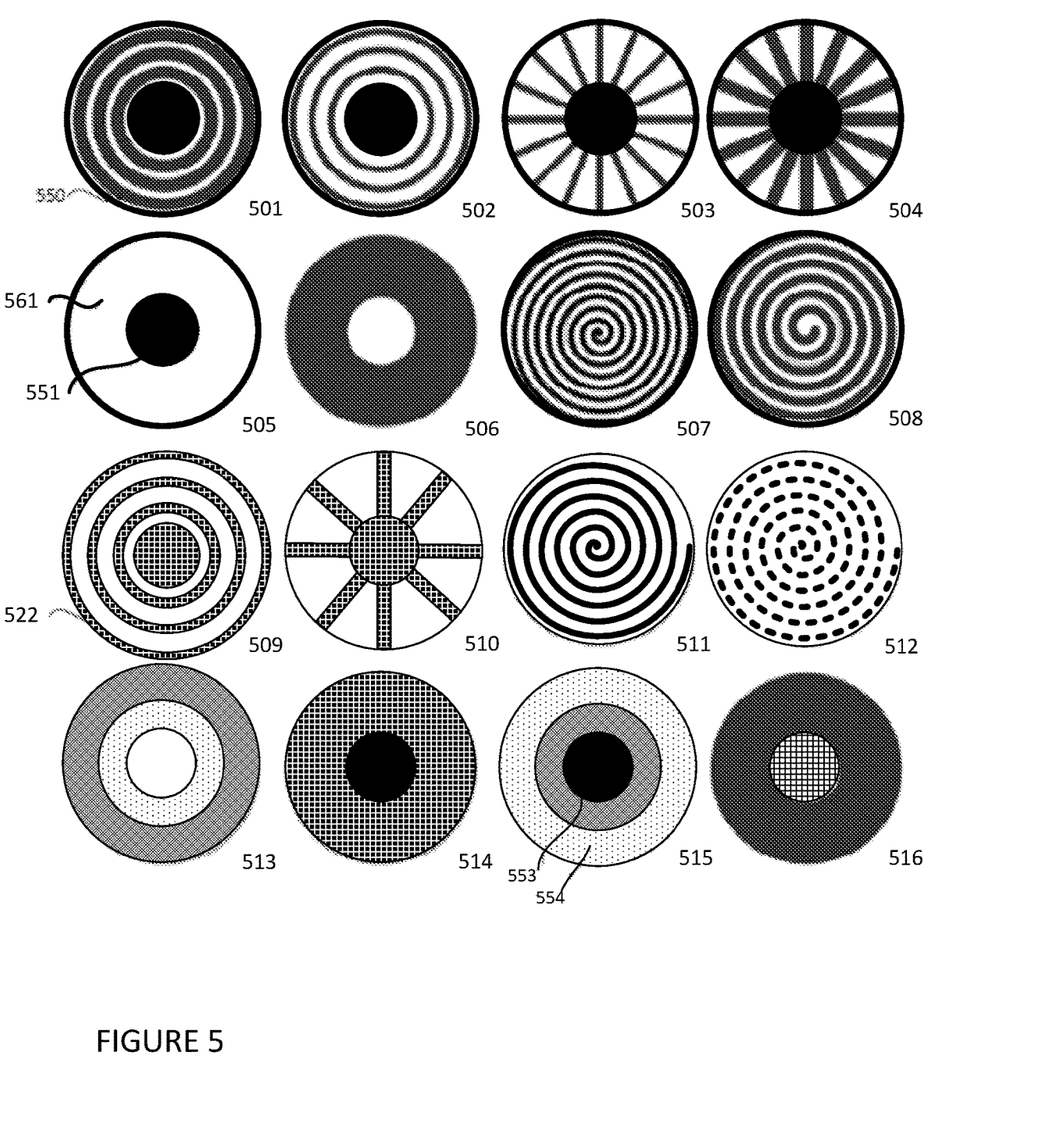
FIG. 5 is an illustration of coating patterns printed on filters in accordance with aspects of the present invention.

To achieve some or all of these performance attributes, the filter may be configured such that the flow pattern and rate of the pressurized fluid through the filter is controlled. For instance, the design of coating applied to the filter may be configured to direct the flow of the pressurized fluid to particular regions of the filter. Turning to FIG. 5 filters 501-516 are shown with different coating patterns applied. The shape of each filter 501-516 is shows as being circular, although the filters may be of any shape, such as square, rectangular, triangular, etc.

The darkened portions of each filter 501-516 represent areas where a coating, such as the coating described herein, has been applied. For instance, filter 501 includes a coating 550 which has been applied in concentric circles around a center circle and filter 505 includes a coating 551 which has been applied in a circle in the center of the filter. The shaded areas represent portions where the coating has been lightly applied, such that the flow of a fluid through the filter at that portion is reduced, but not stopped. For instance, filter 515 includes a coated portion 553 with a coating 554 applied in a gradient pattern which fades as towards the edge of the filter. Similarly, filter 509 may include the same pattern as filter 501, but with a lightly applied coating 552. Areas of the filter, where no coating has been applied, such as portion 561 of filter 505 are shown as white. Although FIG. 5 shows a number of patterns, the coating may be applied in any location on the filter and in any pattern.

The coating may be an ink comprised of one or more solvent, water or free radical based resins. Such resins may include, but are not limited to acrylamide, acrylics, phenolics, bisphenol A type epoxy, non-bisphenol A type epoxy, shellac, carboxymethyl cellulose, cellulose acetate butyrate, cellulosics, chlorinated polyether, chlorinated rubber, epoxy esters, ethylene vinyl acetate copolymers, polyurethane, styrene, butadiene, nitrocellulose, maleics, melamine, natural resins, isocyanates, hydrogenated resin, polyamide, polycarbonate, rosins, polyesters, polyethylene, polyolefins, polypropylene, polystyrene, polyurethane, polyvinyl acetate, silicone, vinyls, and water thinned resins. Additional suitable resins for ink include 100% solids oligomers of all types and monomers of all types. In some instances the resins may be dispersion vinyl resins, such as Plastisol or solution vinyl resins.

To apply the coating to the filter material, the coating 350 may be printed on rolls of filter material in line, such that the coating may be applied at predetermined portions of the filter 304. Methods of printing/coating may include but are not limited to screen printing, digital printing, flexography, gravure, slot die coating, hot and/or cold laminating, roll coating, padding, reverse roll coating, curtain coating, offset printing, letterpress, etc. Upon being printed onto the rolls of filter material the ink may be cured by one or more curing methods such as, but are not limited to, ultraviolet (UV) curing, electron beam (EB) curing, heat curing, cold curing, ambient catalyzed, and ambient crosslinked. In some embodiments a random coating pattern may be applied to the filter material.

The filter material may be die cut, punched, laser cut, plotter cut, etc. In this regard, the filter material may be cut by a die at particular location, and in a particular shape, to allow for the coating to be positioned at a predetermined location on the cut out filter. The filter material may be produced in-line or off-line. For instance, the filter material may be printed and cut in the same process, such that the coating and/or supplements are printed onto the filter as described herein, and then cut or punched in the same production line, (e.g., by a cutting machine downstream from the printing machine). In some embodiments the filter material may be cut off-line, such that the filter is cut at a different location from the printer.

The cut out filter may then be pleated and/or shaped. For instance, a pleating press may pleat the cut out filter in a predetermined shape, in some instances the cut out filter may be pressed into shape, such as a frustoconical shape without pleats. Accordingly, when the filter is pleated and/or inserted into the cartridge, the coating may be positioned in the cartridge such that the pressurized fluid may permeate the filter as designed. In other words, by applying the coating at particular locations on the filter material and cutting the filter material at other particular locations, the cut out filter may assure the desired flow rate and flow pattern of the pressurized fluid through the filter. In some embodiments the filter material may not be pleated or shaped.

Figure 6A:
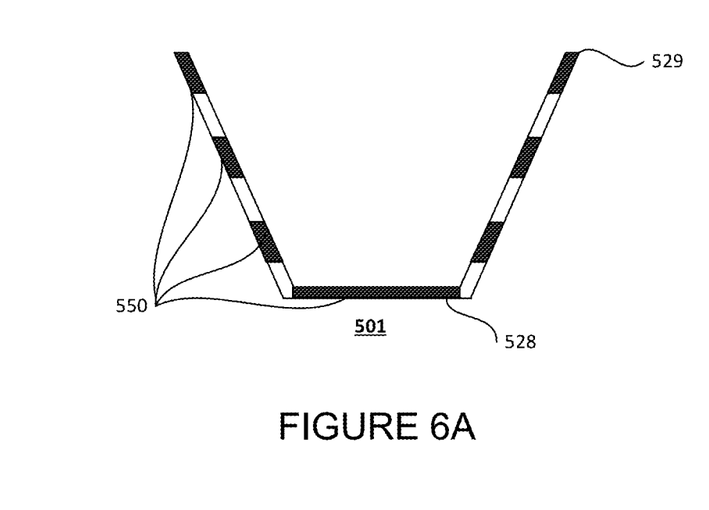
FIGS. 6A and 6B are illustrations of side views of filters with coating patterns printed thereon in accordance with aspects of the present invention.
Figure 6B:
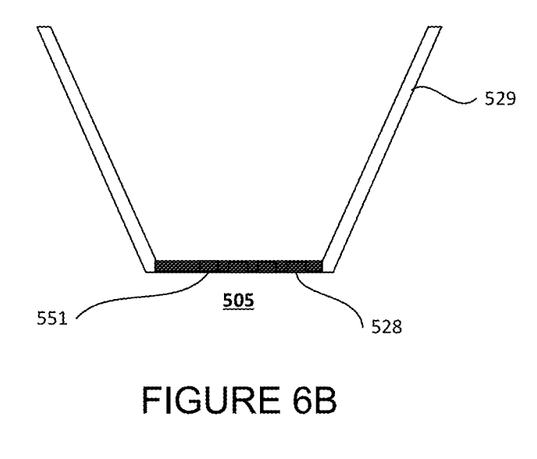

For instance, FIGS. 6A and 6B show side views of filters 501 and 505, respectively, after being shaped into a frustoconical shape, for using a cartridge, such as cartridges 200 and 300. Referring first to filter 501, the coating 550 may create a circle which covers the entire base of the filter 528, while the concentric rings formed by the coating 550 may be positioned up the side walls 529 of the filter. Turning to filter 505, the entire base 528 may be covered by the coating 551, while walls 529 may remain free of a coating.

Supplements may be printed onto the filter and/or layered onto the coating. Supplements may include sweeteners, flavorings, fragrances, pharmaceuticals, nutrative compounds (e.g., nutraceuticals such as vitamins, botanicals (sativa, cannabis, herbs, etc.,), protein, caffeine, fiber, antioxidants, probiotics, other dietary supplements, etc.) or other such additives. In order to print the supplements, the supplements may be microencapsulated, dispersed, suspended and/or solubilized into a printable ink, such as carrageenan, xanthum gum, guar gum, or other such material. In some instances, a small amount of preservative, such as ascorbic acid may be included in the ink. In some instances, the ink may be configured such that the dissolving or dispersion of the supplement within the ink may be released over a period of time. For instance, starches may be mixed with polyvinyl alcohol and into one of the materials for generating the printable supplement such as carrageenan, xanthum gum, guar gum, etc. The period of dissolution or dispersion may be adjusted based on the amount of start, such as a slower period of dissolution or dispersion when more start is used and quicker dissolution or dispersion when less starch is used (or vice versa). In some instances a binder may be added to the ink to maintain the structural integrity of the substances therein. Further, supplements may be applied via printing to the walls, base, and/or lid of the cartridge.

A protective coating may be arranged around the exposed portion of the supplements, such that the supplement does not interact with the substance stored within the filter. In this regard the protective coating may be comprised of one or more of polyvinyl alcohol, xantham gum, or other such ingredient. In some instances the protective coating may form a vapor barrier, oxygen barrier, or to protect the coating from wear, such as during transport or handling of the cartridge, such that the substance within the filter doesn't scrape or wear away the coating or supplement.

Figure 7A:
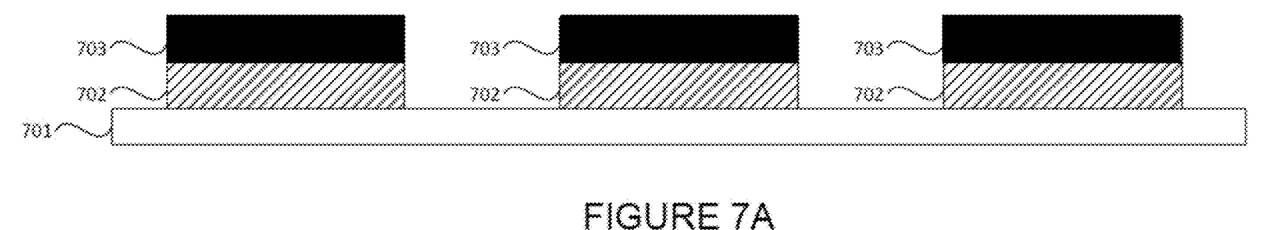
FIGS. 7A-7C are illustrations of coating and supplements printed on filters in accordance with aspects of the present invention.

In one example, a supplement may be printed on top of a coating. For instance, as shown in FIG. 7A, a supplement 703 may be printed on top of coating 702, which in turn may be printed on top of the filter 701.

Figure 7B:
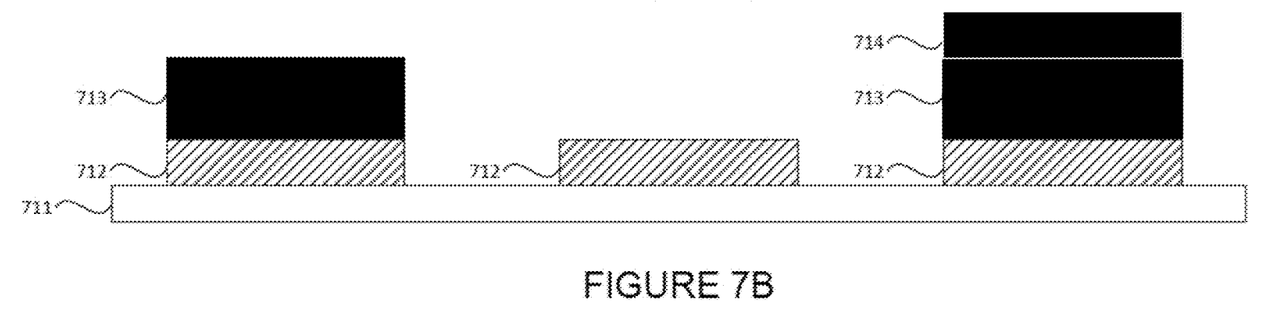

In some instances, the supplements may be applied to only a portion of the coating. For instance, a supplement, such as supplement 713 of FIG. 7B is applied to only a subset of the coatings 712. The determination of where to apply the supplement may be based on the desired dosage of the supplement. For instance, higher dosages of a supplement, such as supplement 713, may require multiple portions of a coating 712 have the supplement printed thereon. Additionally, the thickness of the supplement may be dependent upon the required dosage. For instance, supplements, such as supplement 713, may be printed thicker to deliver more supplements.

In some instances supplements may be layered, such that one supplement is printed on top of other supplements. For example, supplement 714 may be printed on supplement 713, as further shown in FIG. 7B. Although two layers of supplements and two supplements, 713 and 714, are shown in FIG. 7B, any number of layers and any number of supplements may be included. For instance, concomitant drugs may be printed to the same filter or two complimentary flavorings such as pumpkin and spice may be printed to the same filter.

Figure 7C:
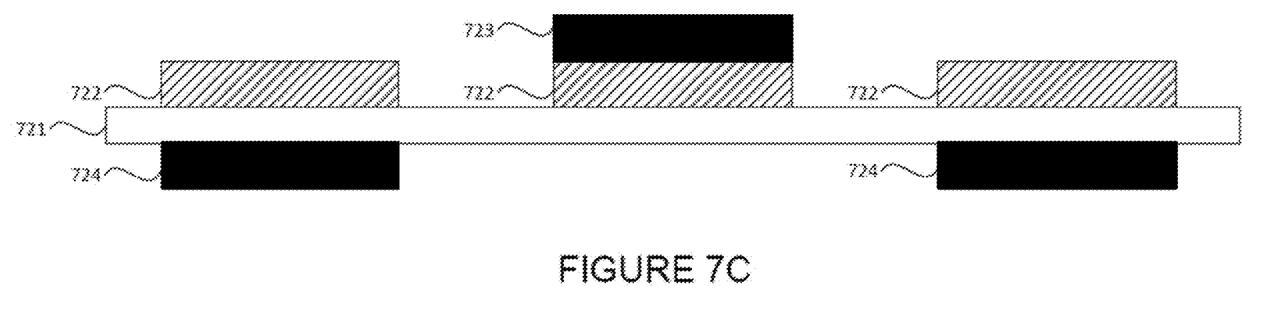

In some instances, the supplements may be applied directly to the filter or other portion of the cartridge. For instance, FIG. 7C shows filter 721 having a coating 722 printed thereon in select locations. A supplement 723 is applied onto the coating and a second supplement 724 is applied directly to the underside of the filter 721.

Although the filters, 701, 711, and 721, of FIGS. 7A-7C, respectively, are shows as flat, they may be of any shape. For instance, upon being shaped, such as into a frustoconical filter, similar to filters 204 and 304, filter 701, 711, and 721 may include supplements and/or coatings on the base and/or side walls of the filter. When positioned within a cartridge, such as cartridges 200 or 300, the filters may form two compartments, such as compartments 201 and 202 of FIG. 2. The filters may have supplements and/or coatings which are positioned on either side of the filter such as within the first compartment and the second compartment. Upon a pressurized fluid may be introduced into the first compartment, the pressurized fluid, such as water, may contact the supplements thereby extracting dissolved and/or suspended materials from the first supplement.

To apply the supplements, such as supplements 703, 713, 723, and 714, to the filter material (or onto other supplements), the supplements may be printed on rolls of filter material, such that the supplements may be applied at predetermined portions of the filter. In some instances, the supplements may be printed onto individual filters. Methods of printing/coating may include but are not limited to screen printing, digital printing, flexography, gravure, slot die coating, hot and/or cold laminating, roll coating, padding, reverse roll coating, curtain coating, etc. Upon being printed onto the rolls of filter material the ink may be cured by one or more curing methods such as, but are not limited to, ultraviolet (UV) curing, electron beam (EB) curing, heat curing, cold curing, ambient catalyzed, and ambient cross-linked. In some embodiments a random coating pattern may be applied to the filter material.

In some embodiments food grade flavoring may be added to the coating itself, such as coatings 350, 550, 551, 702, 712, and 722. In this regard, a flavoring may be microencapsulated, dispersed, suspended and/or solubilized into the coating. Upon a particular pressurized fluid, such as, for example, water, contacting the coating, the flavoring of the coating may solubilize and mix into the pressurized fluid. By way of example, the flavoring may be a French vanilla flavoring, the pressurized fluid may be water, and the beverage medium in the cartridge may be coffee grounds. Upon the water being injected into a cartridge, such as cartridge 200 or 300, the water may contact the coating and solubilize the French vanilla flavoring and also contact the coffee grounds. As such the water may extract coffee from the coffee grounds and the solubilized French vanilla flavoring may mix into the coffee.

In some embodiments food grade fragrances may be added to the coating itself, such as coatings 350, 550, 551, 702, 712, and 722, respectively. In this regard, a fragrance may be microencapsulated, dispersed, suspended and/or solubilized into the coating. Upon a particular pressurized fluid, such as, for example, water, contacting the coating, the fragrance of the coating may solubilize and an aroma may permeate into the air surrounding the fluid filtering process. By way of example, the fragrance may be hazelnut, the pressurized fluid may be water, and the beverage medium in the cartridge may be coffee grounds. Upon the water being injected into the cartridge 200 or 300 the water may contact the coating and solubilize the hazelnut flavoring and also contact the coffee grounds. As such the water may extract coffee while a hazelnut aroma may enhance the brewing aroma.

Additionally, a fragrance that reduces or neutralizes that odor may be included in the coating itself. For example, a material being filtered may put out an off-putting scent, such as sulfur. To counter the sulfur scent, an added fragrance which reduces the sulfur odor may be included in the coating, such as coatings 350, 550, 551, 702, 712, and 722. As such, when the sulfur is filtered the added fragrance may alter the off-putting scent in the area surrounding the filter, such as filter 204 and 304. In some embodiments both flavoring and fragrances may be added to the coating.

In some embodiments materials may be added to the coating itself, such as coatings 350, 550, 551, 702, 712, and 722 to create an oxygen and/or moisture barrier. In this regard, a material, such as polypropylene or desiccants, may be microencapsulated, dispersed, suspended and/or solubilized into the coating. These materials may increase the retardation effects of environmental interaction with the substances stored inside the filter. As such, selective blocking of oxygen and/or moisture in a given area or over the entire filter may increase the life of the substances within the filter.

In some embodiments the coating may include a color changing mechanism. For instance, inks and dyes, such as, by way of example only, thermochromic liquid crystals, pH sensitive dyes, leuco dyes, etc., may be added to the coating. The color changing mechanism may cause a design to become visible upon a pressurized liquid of a predetermined temperature, pH level, or other parameter, being added to the cartridge. The thermochromic ink may be used to create coupons, rewards, art, messages, etc.

Figure 8:
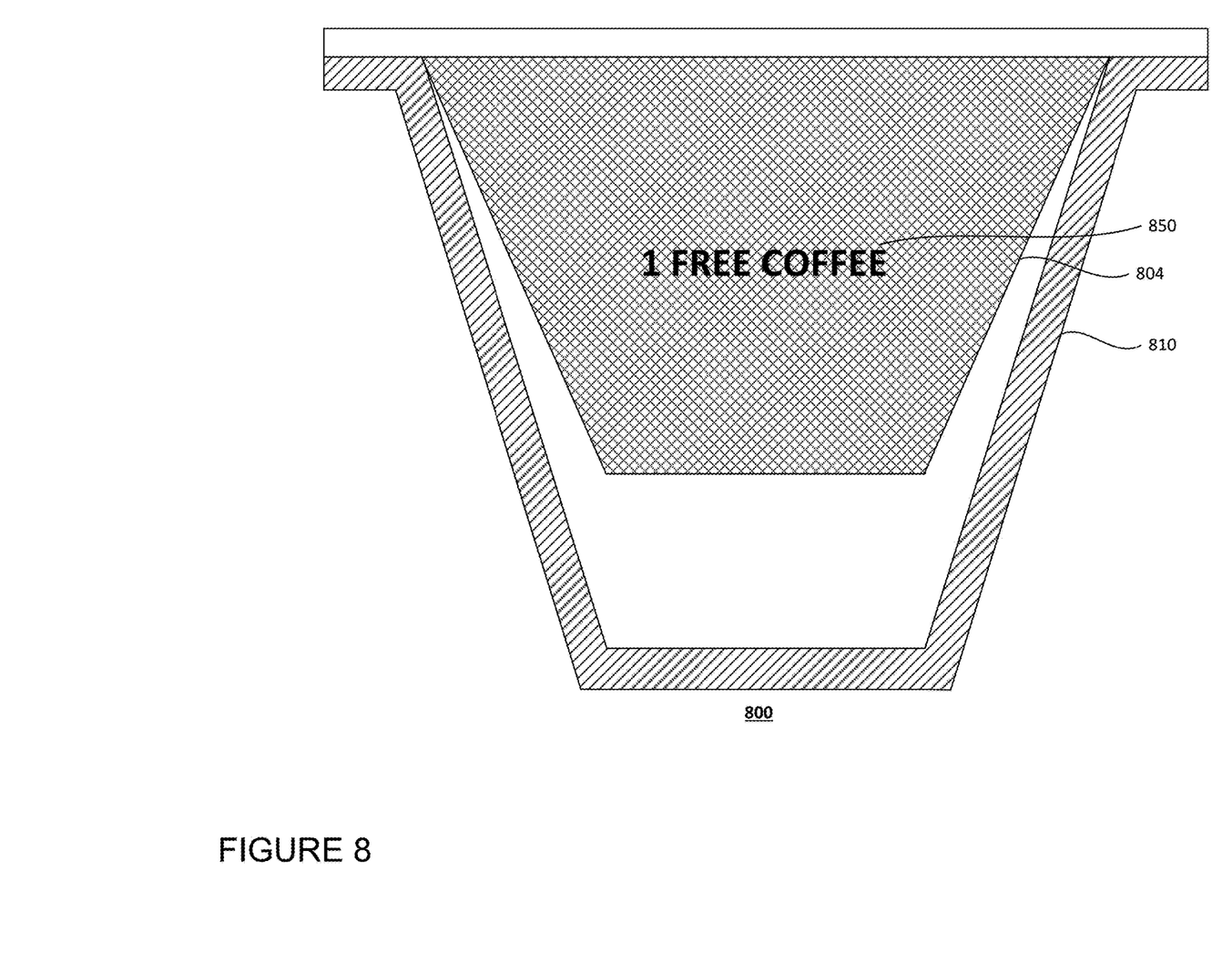
FIG. 8 is an illustration of a thermochromic ink printed on a filter in accordance with the present invention.

For example, as shown, in FIG. 8, a cartridge 800 constructed from a clear container 810 may include a filter 804. A thermochromic coating 850 may be printed onto the filter 804. Upon a pressurized fluid of a predetermined temperature being added to the cartridge 800, the thermochromic coating 850 may become visible revealing an incentive of "1 Free Coffee."

Figure 9:
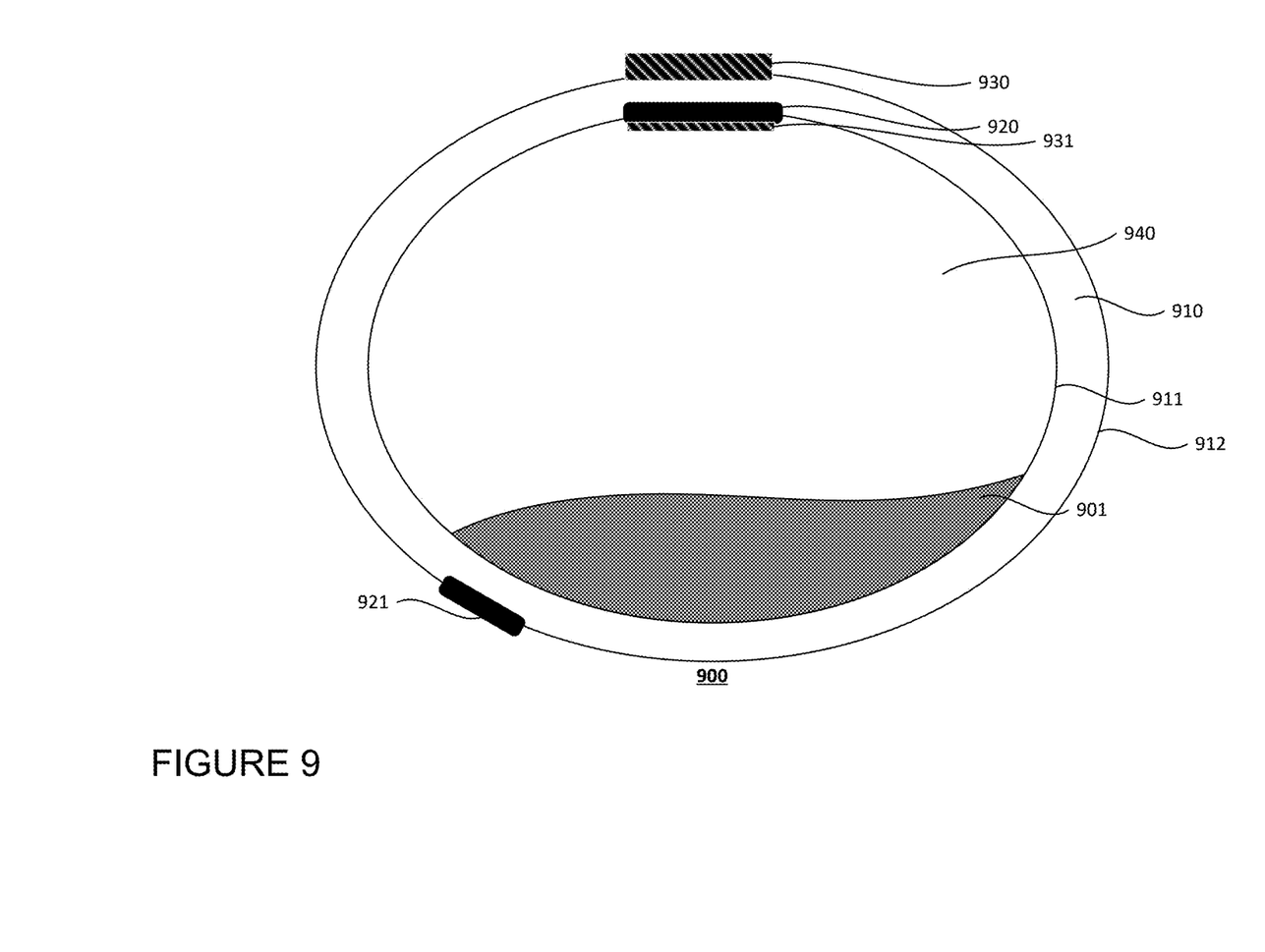
FIG. 9 is an illustration of a filter pack with a coating and supplements printed thereon in accordance with aspects of the invention.

In some instances, the filter itself may be self-sealing. In this regard, the filter may form a fully enclosed cartridge wherein a substance, such as coffee grounds or tea leaves may be positioned. The entire filter may be submerged in or have a fluid directed there through. For instance, the filter may be positioned within an enclosure, such as a basket, cup, bowl, mug, or other such enclosure and water may be poured on the filter. Upon being submerged or covered, the fluid may permeate into the interior of the filter and extract dissolved and/or suspended materials from the substance. The fluid, including the extracted materials may then permeate back through the filter and into a vessel, such as a cup, bowl, mug, etc. For example, FIG. 9 shows a self-sealing filter 910 with an inner-face 911 and an outer-face 912. The interior compartment 940 of the filter 900 may hold a substance 901. Although FIG. 9 shows a filter with only a single compartment, the filter may be separated into more than one compartment.

Supplements and coatings may be applied to the self-sealing filter. Referring again to FIG. 9, a coating 920 is applied to inner-face 911 and a second coating 921 is applied to outer-face 912. Similarly, supplement 930 is applied to outer-face 912, while supplement 931 is layered upon the first coating 920. In some instances a supplement may be printed directly upon the interior-face 911. In some embodiments, the coatings and supplements may be applied via printing as described herein.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A cartridge comprising:
a filter comprising filter material arranged to separate the cartridge into first and second compartments, wherein the first compartment stores a first substance and is positioned adjacent the second compartment;
a permanent, non-dissolvable coating arranged on at least one exterior portion of the filter material,
wherein the coating is a printable ink including one or more resins printed directly onto the filter material,
wherein the coating decreases the permeability of the filter material at the at least one exterior portion of the filter material, and
wherein the coating is configured to control the flow rate and flow pattern of a fluid through the filter material such that a pressure of the fluid in the first compartment matches a predetermined pressure level during extraction of the first substance by the fluid; and
a first supplement, wherein the first supplement is printed directly on the coating, such that a first side of the coating contacts a first surface of the filter material and the first supplement contacts, a second, opposite side of the coating.

2. The cartridge of claim 1 further comprising:
a sidewall;
a bottom; and
an opening, wherein the sidewall, bottom, and opening form a frustoconical shape.

3. The cartridge of claim 2, further comprising a lid, the lid sealing the opening.

4. The cartridge of claim 1, wherein the coating makes the at least one exterior portion of the filter material impermeable.

5. The cartridge of claim 1, wherein a first side of the filter is within the first compartment, and a second, opposite side of the filter is within the second compartment.

6. The cartridge of claim 5, wherein the at least one exterior portion of the filter is on the first side of the filter.

7. The cartridge of claim 5, wherein the at least one exterior portion of the filter is on the second side of the filter.

8. The cartridge of claim 1, wherein a second supplement is arranged directly on the filter material.

9. The cartridge of claim 1, wherein a second supplement is printed on the first supplement, such that a first side of the first supplement contacts the coating, and a second opposite side of the first supplement contacts the second supplement.

10. The cartridge of claim 1, wherein the first supplement is one or more of sweeteners, flavorings, fragrances, pharmaceuticals, and nutritive compounds.

11. The cartridge of claim 1, wherein:
the first surface of the filter material is exposed to the first compartment and a second opposite surface of the filter material is exposed to the second compartment, and
the coating is arranged on at least one portion of the filter material on the first surface of the filter material.

12. The cartridge of claim 1, wherein the one or more resins include acrylamide, acrylics, phenolics, bisphenol A type epoxy, non-bisphenol A type epoxy, shellac, carboxymethyl cellulose, cellulose acetate butyrate, cellulosics, chlorinated polyether, chlorinated rubber, epoxy esters, ethylene vinyl acetate copolymers, polyurethane, styrene, butadiene, nitrocellulose, maleics, melamine, natural resins, isocyanates, hydrogenated resin, polyamide, polycarbonate, rosins, polyesters, polyethylene, polyolefins, polypropylene, polystyrene, polyurethane, polyvinyl acetate, silicone, vinyls, and/or water thinned resins.

* * * * *